US007766432B2

(12) United States Patent
Hinz et al.

(10) Patent No.: US 7,766,432 B2
(45) Date of Patent: Aug. 3, 2010

(54) MOTORCYCLE BRAKE SYSTEM

(75) Inventors: Axel Hinz, Neu-Anspach (DE);
Günther Vogel, Dreieich (DE)

(73) Assignee: Continental Teves AG & Co. oHG (DE)

( * ) Notice: Subject to any disclaimer, the term of this patent is extended or adjusted under 35 U.S.C. 154(b) by 587 days.

(21) Appl. No.: 11/665,041

(22) PCT Filed: Sep. 28, 2005

(86) PCT No.: PCT/EP2005/054882

§ 371 (c)(1),
(2), (4) Date: Apr. 9, 2007

(87) PCT Pub. No.: WO2006/040262

PCT Pub. Date: Apr. 20, 2006

(65) Prior Publication Data

US 2009/0008199 A1 Jan. 8, 2009

(30) Foreign Application Priority Data

Oct. 13, 2004 (DE) ............... 10 2004 049 749
Feb. 5, 2005 (DE) ............... 10 2005 005 390

(51) Int. Cl.
*B60T 8/32* (2006.01)
(52) U.S. Cl. ............... 303/137; 303/113.1; 303/119.3
(58) Field of Classification Search ............ 303/137,
303/113.1, 113.2, 113.3, 116.1, 116.2, 116.3,
303/116.4, 119.1, 119.2, 119.3, 10, 11, 12,
303/DIG. 10, DIG. 11
See application file for complete search history.

(56) References Cited

U.S. PATENT DOCUMENTS 5,975,652 A * 11/1999 Otto ................. 303/113.1

| | | | | |
|---|---|---|---|---|
| 6,260,933 B1* | 7/2001 | Dinkel et al. | ............... | 303/113.1 |
| 6,398,315 B1* | 6/2002 | Dinkel et al. | ............... | 303/113.1 |
| 6,688,707 B1* | 2/2004 | Dinkel et al. | ............... | 303/119.3 |
| 6,846,050 B2* | 1/2005 | Inoue et al. | ............... | 303/119.3 |
| 6,877,822 B2* | 4/2005 | Dinkel et al. | ............... | 303/119.3 |
| 7,018,003 B2* | 3/2006 | Otto et al. | ............... | 303/119.3 |
| 7,322,658 B2* | 1/2008 | Hinz et al. | ............... | 303/119.3 |
| 2008/0106145 A1* | 5/2008 | Hinz et al. | ............... | 303/152 |

FOREIGN PATENT DOCUMENTS

| | | |
|---|---|---|
| DE | 44 06 269 A1 | 9/1994 |
| DE | 199 58 194 A1 | 1/2001 |
| DE | 102 09 984 A1 | 10/2002 |
| EP | 1 277 635 A2 | 1/2003 |

OTHER PUBLICATIONS

Patent Abstract of Japanese Publication No. 2000071963 dated Mar. 7, 2000.
Patent Abstract of Japanese Publication No. 11314591 dated Nov. 16, 1999.
Patent Abstract of Japanese Publication No. 11314589 dated Nov. 16, 1999.

* cited by examiner

*Primary Examiner*—Pam Rodriguez
(74) *Attorney, Agent, or Firm*—RatnerPrestia

(57) ABSTRACT

A hydraulic motorcycle brake system includes an accommodating member for the hydraulic connection of two master brake cylinders to the front-wheel brake and rear-wheel brake having several pressure channels for the front-wheel circuit and rear-wheel brake circuit, and allowing manufacture in a simplest possible manner, and a pair of wheel brake connections connectable to the rear-wheel brake and front-wheel brake open into a lateral surface of the accommodating member, the wheel brake connections being arranged between a pair of pressure connections that are connectable to the two master brake cylinders.

10 Claims, 2 Drawing Sheets

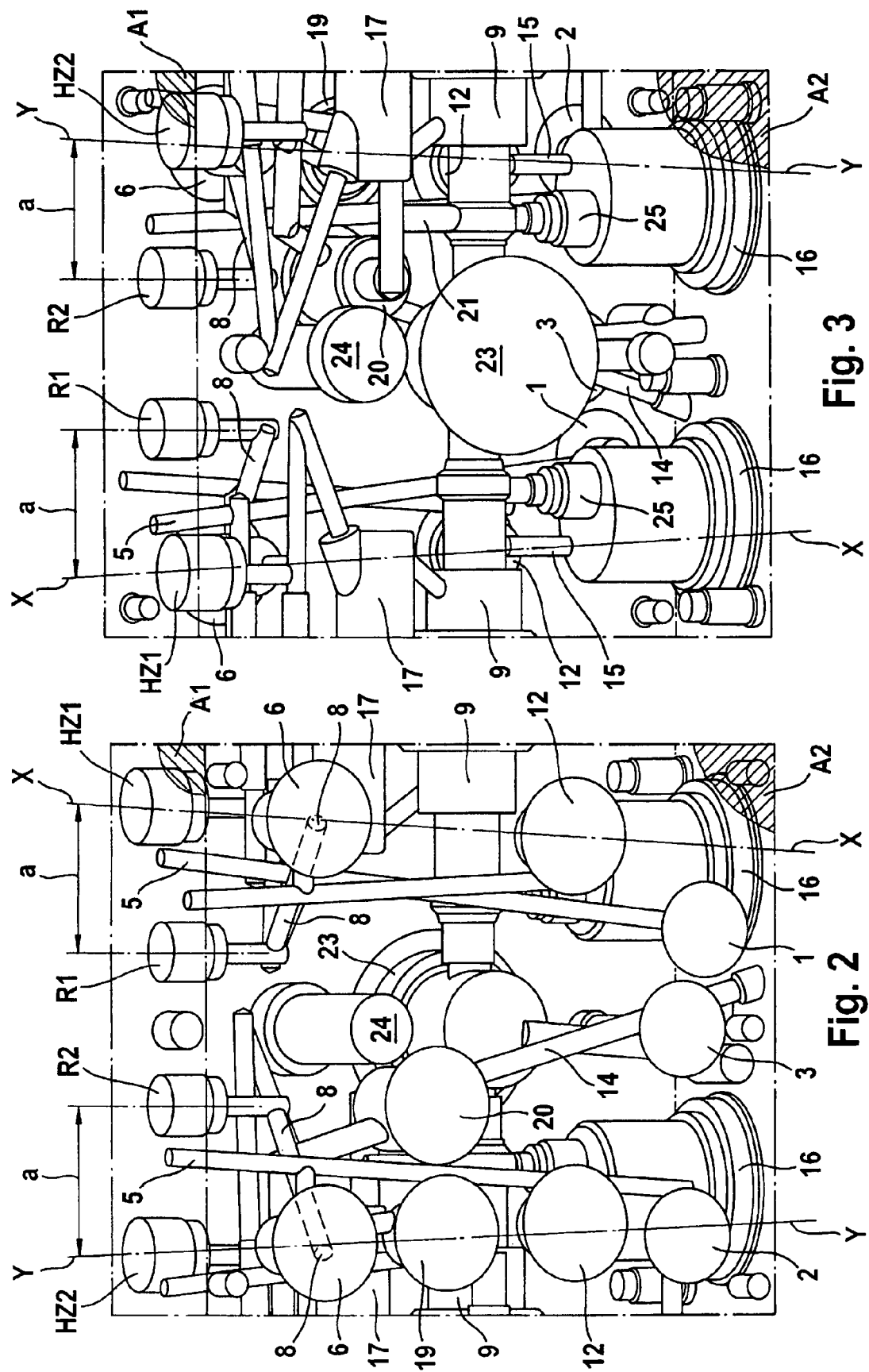

MOTORCYCLE BRAKE SYSTEM

RELATED APPLICATIONS

This application is the U.S. national phase application of PCT International No. PCT/EP2005/054882, filed Sep. 28, 2005, which claims priority to German Patent Application No. DE102004049749.4, filed Oct. 13, 2004 and German Patent Application No. DE102005005390.4, filed Feb. 5, 2005, the contents of such patents being incorporated by reference herein.

BACKGROUND OF THE INVENTION

The present invention relates to a motorcycle brake system.

DESCRIPTION OF THE RELATED ART

EP 1 277 635 A2 discloses a motorcycle brake system. The brake system includes a hydraulically operable front-wheel and rear-wheel brake circuit comprising a pair of foot-operated or manually operated master brake cylinders. For brake slip control, electromagnetically activatable inlet and outlet valves are mounted in the front-wheel and rear-wheel brake circuits, as well as a pump is provided for pressure buildup in the two brake circuits irrespective of the actuation of the two master brake cylinders.

A first pressure sensor is arranged between the inlet valve and the master brake cylinder at the front-wheel brake circuit. A second pressure sensor senses the wheel brake pressure in a rear-wheel brake connected to the rear-wheel brake circuit. In addition, a pressure sensor sensing the master brake cylinder pressure in the rear-wheel brake circuit is provided.

In order that the hydraulic circuitry can be realized in the prior-art motorcycle in a very small mounting space, it is particular importance to skillfully arrange all functionally critical components in a skillful manner.

SUMMARY OF THE INVENTION

The invention relates to a motorcycle brake system designed as compact as possible with a simple, reliable hydraulic connection for the two master brake cylinders and the two wheel brakes is ensured.

BRIEF DESCRIPTION OF THE DRAWINGS

Further features and advantages of the invention can be seen in the subsequent description of an embodiment for a motorcycle brake system.

FIG. 2 is a perspective view of an accommodating member provided for the motorcycle brake system of FIG. 1;

FIG. 3 is a perspective view, turned by 180 degrees, of the accommodating member according to FIG. 2 on its rear side.

DETAILED DESCRIPTION OF THE PREFERRED EMBODIMENTS

Figure 1:
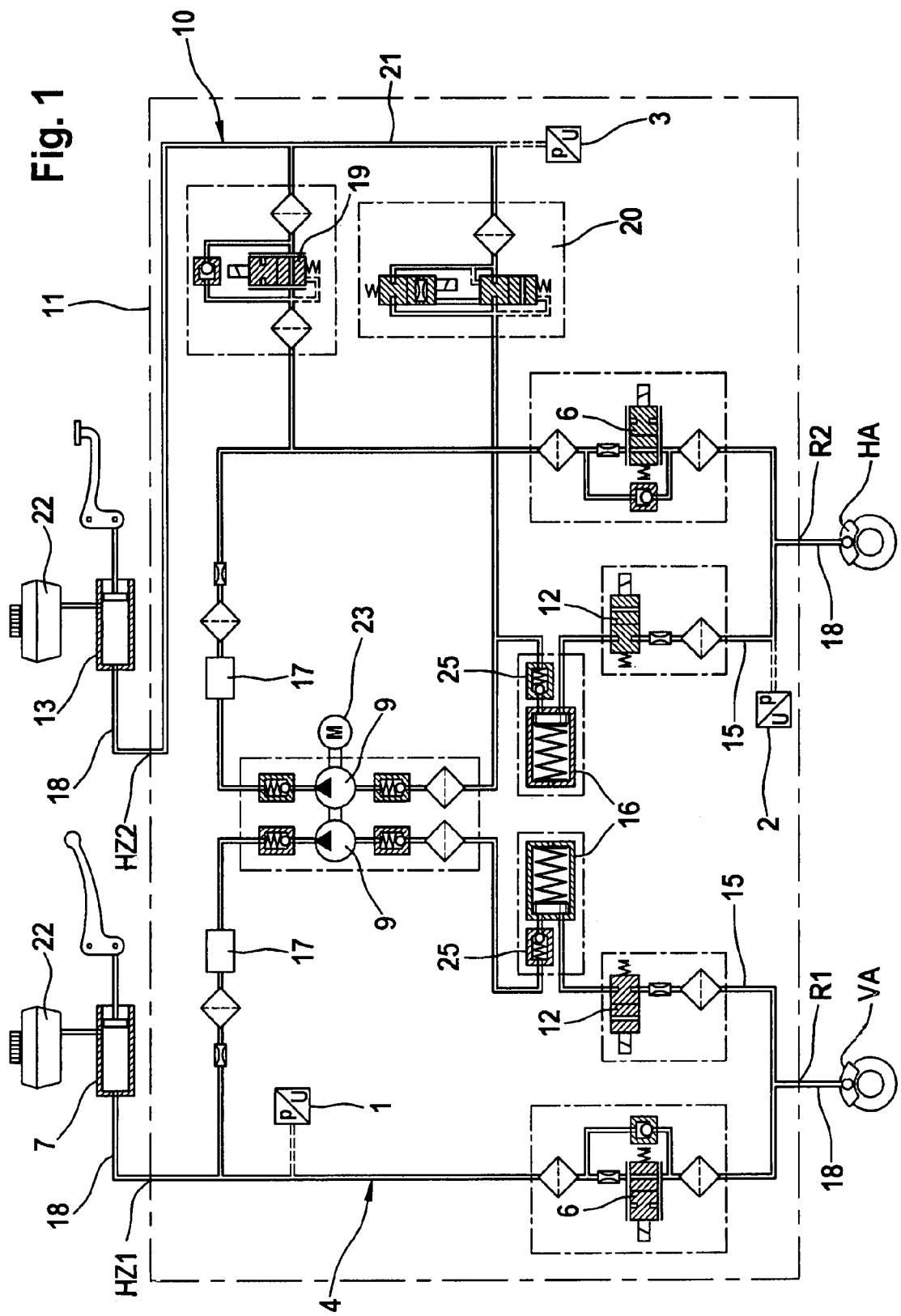
FIG. 1 shows the hydraulic circuit configuration for a motorcycle brake system.

FIG. 1 shows the hydraulic circuit configuration of the motorcycle brake system according to an exemplary embodiment of the invention for better comprehension of the accommodating member 11 illustrated in FIGS. 2, 3. The brake system comprises a hydraulically operable front-wheel and rear-wheel brake circuits 4, 10, with each one master brake cylinder 7 connected to the front-wheel brake circuit 4 and operable proportionally by manual force and a master brake cylinder 13 at the rear-wheel brake HA that is operable in proportion to leg force.

For brake slip control, electromagnetically operable inlet and outlet valves 6, 12 are fitted in the front-wheel and rear-wheel brake circuit 4, 10, and the inlet valve 6 that is open in its basic position is inserted into the brake line of the front-wheel or rear-wheel brake circuit 4, 10 which connects the associated master brake cylinder 7, 13 to the front-wheel or rear-wheel brakes VA, HA. The outlet valve 12 that is closed in its basic position is respectfully inserted into a return line 15 of each brake circuit, which connects the front-wheel or rear-wheel brakes VA, HA to respectively one low-pressure accumulator 16 and, by way of non-return valves 25, to the suction side of a dual-circuit pump 9 that operates according to the return principle. The pump 9 is in connection with the brake lines 18 by way of noise-damping chambers 17 inserted into the two brake circuits so that a return delivery of the brake fluid volume discharged in each case from the front-wheel or rear-wheel brake VA, HA is safeguarded in conformity with requirements.

In addition to the features of the front-wheel brake circuit 4 described hereinabove, the rear-wheel brake circuit 10 includes an electromagnetically operable separating valve 19 which is open in its basic position and is inserted into the brake line 18 between the master brake cylinder 13 and the inlet valve 6. Further, a suction conduit 21 leading to the pump 9 by way of an electric change-over valve 20, is connected between the separating valve 19 and the master brake cylinder 13 to the brake line 18 of the rear-wheel brake circuit 10, with the result that the pump component acting in the rear-wheel brake circuit 10 is able to take pressure fluid for pressure build up in the rear-wheel brake circuit 14 from the master brake cylinder 13 and the supply tank 22 connected to the master brake cylinder 13, with the change-over valve 20 being electrically energized, and to deliver it to the rear-wheel brake 14, while the separating valve 19 stays in its electrically energized closed position.

A first pressure sensor 1 is arranged at the brake line 18 of the front-wheel brake circuit 4 upstream of the inlet valve 6 in order to sense the master brake cylinder pressure supplied to the front-wheel brake circuit 4. A second pressure sensor 2 is connected to the rear-wheel brake circuit 10 between the inlet valve 6 and the outlet valve 12 in order to sense the wheel brake pressure in the rear-wheel brake circuit 10.

The inlet valves 6 allow limiting the brake pressure generated in the brake lines 18 in the dual-circuit brake system at any time. Brake pressure reduction in the wheel brakes is performed using the outlet valves 12, which can be opened electromagnetically in the direction of the two low-pressure accumulators 16.

A third pressure sensor 3 is connected to the rear-wheel brake circuit 10 upstream of the separating valve 19 in order to detect also the master brake cylinder pressure applied to the rear-wheel brake HA.

The master brake cylinder pressure sensed by the first pressure sensor 1 in the front-wheel brake circuit 4 represents the command variable for the electric activation of the pump 9 that is mounted in the rear-wheel brake circuit 10 and, in cooperation with the inlet and outlet valves 6, 12 the separating and-change-over valves 19, 20 brings about an automatic brake pressure build-up in the rear-wheel brake circuit 10 according to an electronic brake-force distribution characteristic curve stored in a control unit, when exclusively the master brake cylinder 7 connected to the front-wheel brake circuit 4 is actuated.

To evaluate signals of the first, second, and third pressure sensor 1, 2, 3 a logic circuit is provided in the electronic control unit, in which a hydraulic pressure in the rear-wheel brake circuit 10 is produced by means of the electrically operable pump 9 depending on the result of evaluation of the pressure sensor signals.

The control unit (not shown) preferably forms a cap-shaped add-on part fitted to the accommodating member 11 and being favorably plugged on the three pressure sensors 1, 2, 3 integrated in the accommodating member 11 and the inlet and outlet valves 6, 11 integrated in the sensors for electrical contacting purposes. Thus, the especially compact construction allows fastening the accommodating member 11 to a motorcycle frame close to a battery.

Based on the hydraulic concept illustrated in FIG. 1, the basic features of the invention will now be explained with respect to FIGS. 2 and 3.

FIG. 2 illustrates a perspective view of the block-shaped accommodating member 11, with several pressure channels required for the front-wheel and rear-wheel brake circuit 4, for the hydraulic connection of the two master brake cylinders 7, 13 to the front-wheel and rear-wheel brake VA, HA, to what end a pair of wheel brake connections R1, R2 that are connectable to the rear-wheel and front-wheel brake HA, VA open into a horizontal lateral surface A1 of the accommodating member 11, which connections R1, R2 are arranged between a pair of pressure connections HZ1, HZ2 that are connectable to the two master brake cylinders 7, 13 being operable independently of one another.

In this arrangement, a distance a is dimensioned for each brake circuit 4, 10 in the accommodating member 11, between the wheel brake connection R1 or R2, respectively, and an inlet valve 6 allocated to the respective wheel brake connection in such a way that, by means of a blind-end bore 8 opening into an orifice of the accommodating bore provided for the respective inlet valve 6, a direct hydraulic connection is ensured to the wheel brake connection R1 or R2, respectively of the front-wheel or rear-wheel brake circuit 4, 10. The distance 'a' allows providing a particularly simple, short pressure channel, which is configured as a transverse channel and does not require a ball closure or closing plug at its end.

The accommodating member 11 further includes the first pressure sensor 1 in an accommodating bore which is arranged remote from the pressure connection HZ1 and laterally offset relative to a first bore row X, said accommodating bore opening into an end face A2 of the accommodating member 11 transversely to the pressure connection HZ1. The insignificant offset of the first pressure sensor 1 relative to the first bore row X, allows the pressure channel 5 leading from the lateral surface A1 to the pressure sensor 1 to be designed favorably as a blind-end bore that must be closed on the lateral surface A1 only. The second pressure sensor 2 is inserted into an accommodating bore remote from the pressure connection HZ2 at the end of a second bore row Y, which likewise opens transversely to the pressure connection HZ2 into the end face A2 of the accommodating member 11. Favorably, a pressure channel 5 that is configured as a blind-end bore favorably leads from the direction of the lateral surface A1 also to pressure sensor 2. Pressure channel 5 leads beside the wheel brake connection R1, R2 at a defined angle of direction into the accommodating member 11 between two accommodating bores provided for the separating and change-over valve 19, 20.

In the front surface of accommodating member 11, two accommodating bores are arranged in the first bore row X and four accommodating bores are arranged in the second bore row Y, and the vertically extending first row X accommodates exclusively the inlet and outlet valve 6, 12 required for the brake slip control in the front-wheel brake circuit 4, while the vertically arranged second row Y accommodates exclusively the inlet and outlet valve 6, 12 required for the brake slip control in the rear-wheel brake circuit 10, the electric separating valve 19 as well as the second pressure sensor 2. Opening into the end surface A2 of the accommodating member 11, between the two bore rows X, Y, is another pair of offset accommodating bores which house the electric change-over valve 20 and the additional (third) pressure sensor 3.

A pressure channel 14 traverses the accommodating bores provided for the additional pressure sensor 3 and the electric change-over valve 20 in the direction of the pressure connection HZ2, which can be connected to the master brake cylinder 13 provided for the operation of the rear-wheel brake circuit 10.

The two pressure connections HZ1, HZ2 opening into the lateral surface A1 of the accommodating member 11 are arranged so as to be roughly in alignment with the longitudinal plane of the two bore rows X, Y, while the wheel brake connections R1, R2 opening into the lateral surface A1 of the accommodating member 11 are aligned in parallel between the two pressure connections HZ1, HZ2. A connecting pattern is hence achieved for the accommodating member 11, which allows screwing all brake conduits that lead to the two master brake cylinders HZ1, HZ2 and the wheel brakes VA, HA at the lateral surface A1.

Further, additional accommodating bores for the low-pressure accumulator 16, the pump 9 and the electric motor 23 driving the pump 9 as known from FIG. 1, become apparent from the view of FIG. 1 in the background of the accommodating bores that partly extend as blind-end bores into the end surface. The accommodating bores provided for the two low-pressure accumulators 16 are arranged behind the two flat accommodating bores of the first and second pressure sensor 1, 2.

The accommodating bore for the pump 9 extends through the accommodating member 11 above the accommodating bores provided for the outlet valves 12 in the bore rows X, Y in a horizontal position, and the positions of the accommodating bores for the separating valve 19 and the change-over valve 20 in the accommodating member 11 being chosen in such a fashion that a sufficient distance is ensured for the integrating the accommodating bore in the accommodating member 11 that is provided for the pump 9. As an axially offset radial piston pump is employed, the pump-accommodating bore has a bipartite design in order to realize the piston offset. An accommodating bore for the electric motor 23 driving the pump 9 opens from the opposite direction relative to the end surface A2 into the accommodating member 11 between this bipartite pump accommodating bore.

The noise damping chambers 17 known from FIG. 1 are suitably positioned between the accommodating bores of the inlet valves 6 and the pump accommodating bore as blind-end bores that open horizontally from both sides into the accommodating member 11. The result are the hydraulic connections (principally apparent from FIG. 1) to the pump accommodating bore and to the pressure connections HZ1, HZ2 as pressure channels that can be manufactured especially easily, while there is no need for sophisticated ball closure.

Due to the skillful arrangement of the bore rows X, Y within the two lateral areas of the end face A2, it is possible to make the necessary pressure channels by simple, mainly short drilling operations. The effort for machining operations is minimized and, in addition, allows comprehensive design freedom for realizing the accommodation bore for the electric motor 23, for integrating the gear required between electric motor 23 and pump 9, and for positioning an electric plug 24 in the accommodating member to connect the electric motor 23 to the control unit.

FIG. 3 shows the accommodating member 11 according to FIG. 2 as seen from the back side and thus completes the previously described design of the accommodating member 11 by the area of illustration, which is partly concealed in the illustration of FIG. 2. The details described with respect to FIGS. 1 and 2 can be found accordingly in FIG. 3.

Principally the following statements apply to the motorcycle brake system:
1. An tendency to lock of the front or rear wheel is reliably detected by means of wheel rotational speed sensors (not shown) and their signal evaluation in the control unit. The inlet valve 6 arranged in the front-wheel or rear-wheel brake circuit 4, 10 is closed electromagnetically by way of the control unit in order to discontinue further pressure development in the front-wheel or rear-wheel brake circuit 4, 10.
2. Should further pressure decrease be required in addition in the front-wheel or rear-wheel brake circuit 4, 10 in order to reduce the tendency to lock, this is achieved by opening the normally closed outlet valve 12 that is connectable to the low-pressure accumulator 16. The outlet valve 12 is closed as soon as the wheel acceleration re-increases beyond a defined extent. In the pressure decrease phase the corresponding inlet valve 6 remains closed so that the master brake cylinder pressure generated in the front-wheel or rear-wheel brake circuit 4, 10 cannot propagate to the front-wheel or rear-wheel brake circuit 4, 10.
3. When the slip values found permit pressure build-up in the front-wheel or rear-wheel brake circuit 4, 10 again, the inlet valve 6 is opened in a temporally limited manner to comply with the demand of a slip controller integrated in the control unit. Pump 9 supplies the hydraulic volume necessary for pressure buildup.

Outside brake slip control, exclusively a force-proportional pressurization of the rear-wheel brake HA due to the hydraulic circuit concept when the master brake cylinder 13 connected to the rear-wheel brake circuit 10 is actuated (proportional to leg force), i.e. the front-wheel brake circuit 4 stays unpressurized until the master brake cylinder 7 connected to the front-wheel brake circuit 4 is actuated (proportional to manual force).

It is considered another special feature of the motorcycle brake system presented that the rear-wheel brake is also braked by an appropriate pump actuation when the front-wheel brake circuit is actuated proportionally to force. To this end, the pump 9 removes pressure fluid from the master brake cylinder 13 through the electrically opened change-over valve 20 and delivers it to the rear-wheel brake 14. As this occurs, the separating valve 19 remains in the closed position, in an electrically operated manner, whereby it is safeguarded that the pump pressure does not escape into the master brake cylinder 13.

The invention claimed is:

1. A motorcycle brake system with a hydraulically operable front-wheel brake circuit and rear-wheel brake circuit, comprising two master brake cylinders for the independent actuation of both brake circuits, one inlet valve and one outlet valve provided in each brake circuit for brake slip control, one pump for the pressure supply of the front-wheel brake circuit and rear-wheel brake circuit, the supply pressure of the pump that is active in the rear-wheel brake circuit being applicable not only to a front-wheel brake but also to a rear-wheel brake depending on a force-proportional actuation of the master brake cylinder connected to the front-wheel brake circuit;
wherein an accommodating member having several pressure channels is provided for the hydraulic connection of the two master brake cylinders to the front-wheel brake and rear-wheel brake, of the front-wheel brake circuit and rear-wheel brake circuit, and first and second wheel brake connections that are connectable to the rear-wheel brake and front-wheel brake open into a lateral surface of the accommodating member, which wheel brake connections are arranged between first and second pressure connections that are connectable to the two master brake cylinders being operable independently of each other.

2. The motorcycle brake system as claimed in claim 1, wherein a distance between the first wheel brake connection and an accommodating bore provided for the inlet valve in the accommodating member is dimensioned in such a way that a direct hydraulic connection is established to the first wheel brake connection, which is part of the front-wheel brake circuit or the rear-wheel brake circuit, by means of a blind-end bore opening into an orifice of the inlet valve accommodating bore.

3. The motorcycle brake system as claimed in claim 2, including a first pressure sensor for sensing the master cylinder pressure that can be supplied to the front-wheel brake circuit, as well as a second pressure sensor for sensing the wheel brake pressure in a rear-wheel brake connected to the rear-wheel brake circuit;
wherein the first pressure sensor is inserted into an accommodating bore, which is arranged remote from the first pressure connection and laterally relative to a first bore row, said first pressure sensor accommodating bore opening into an end surface of the accommodating member transversely to the first pressure connection, and in that the second pressure sensor is inserted into an accommodating bore of a second bore row remote from the second pressure connection, which opens transversely to the second pressure connection into the end surface of the accommodating member.

4. The motorcycle brake system as claimed in claim 2, wherein several accommodating bores are arranged in the accommodating member in a first bore row and a second bore row, and the first bore row accommodates exclusively the inlet valve and outlet valve required for brake slip control in the front-wheel brake circuit while the second row accommodates the inlet valve and outlet valve required for brake slip control in the rear-wheel brake circuit and the second pressure sensor.

5. The motorcycle brake system as claimed in claim 4, wherein the two pressure connections opening into the lateral surface of the accommodating member are arranged so as to be in alignment in the longitudinal planes of the first and second bore rows.

6. The motorcycle brake system as claimed in claim 4, wherein the wheel brake connections opening into the lateral surface of the accommodating member are arranged between the longitudinal planes of the first and second bore rows.

7. The motorcycle brake system as claimed in claim 4, wherein the second bore row further accommodates an electric separating valve.

8. The motorcycle brake system as claimed in claim 2, wherein arranged between first and second bore rows is a pair of accommodating bores in the end surface of the accommodating member into which an electric change-over valve and an additional pressure sensor are inserted.

9. The motorcycle brake system as claimed in claim 8, wherein a pressure channel traverses the accommodating bores provided for the additional pressure sensor and the electric change-over valve in the direction of the second pressure connection, which can be connected to the master brake cylinder provided for the actuation of the rear-wheel brake circuit.

10. The motorcycle brake system as claimed in claim 1, wherein the wheel brake connections opening into the lateral surface of the accommodating member are arranged between the longitudinal planes of first and second bore rows which accommodate the inlet and outlet valves.

* * * * *